Figure 1:
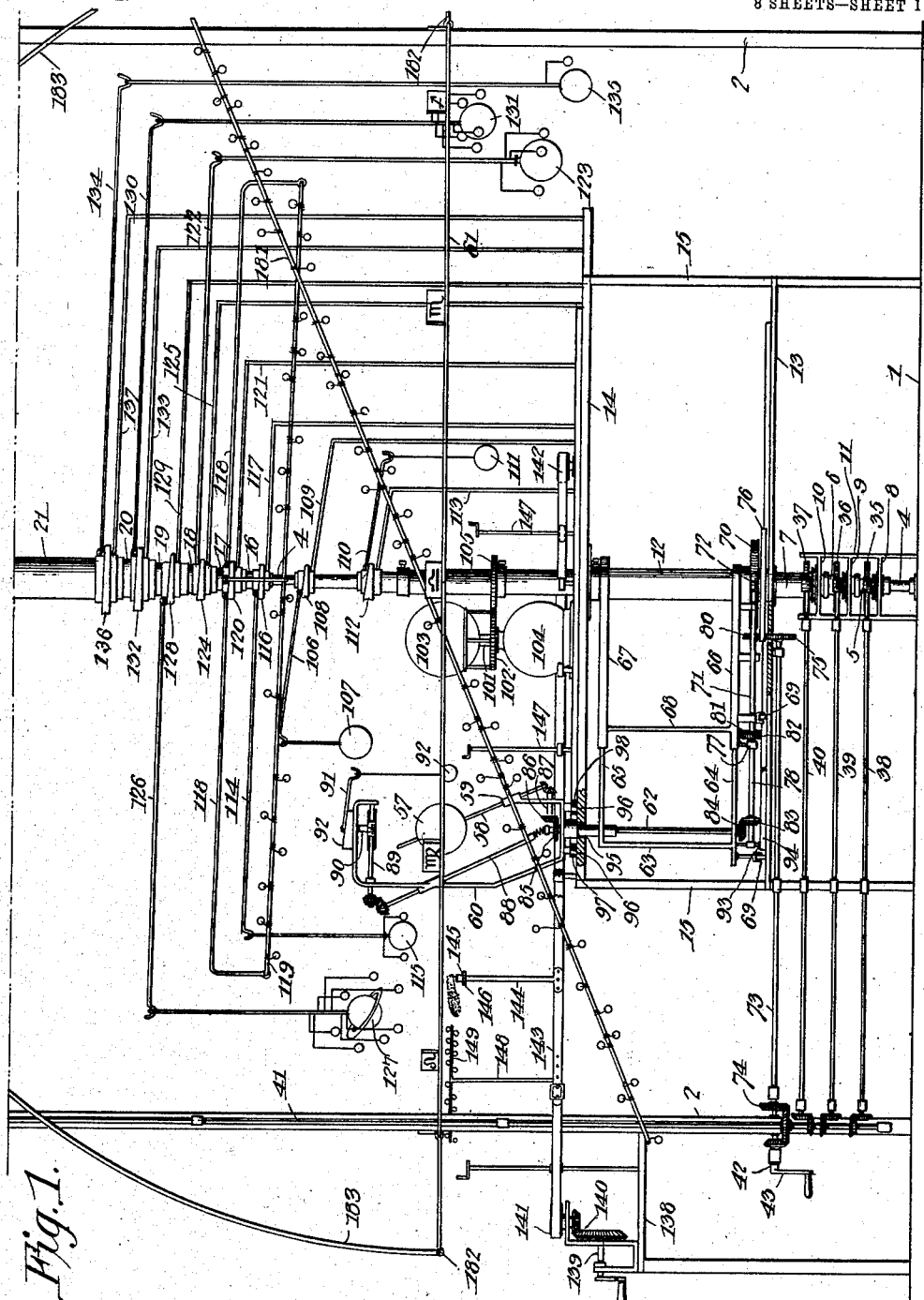

No. 749,508. PATENTED JAN. 12, 1904.
J. P. WESSON.
ORRERY.
APPLICATION FILED JULY 31, 1903.
NO MODEL. 8 SHEETS—SHEET 1.

Witnesses
John P. Wesson, Inventor.
by C. A. Snow & Co.
Attorneys

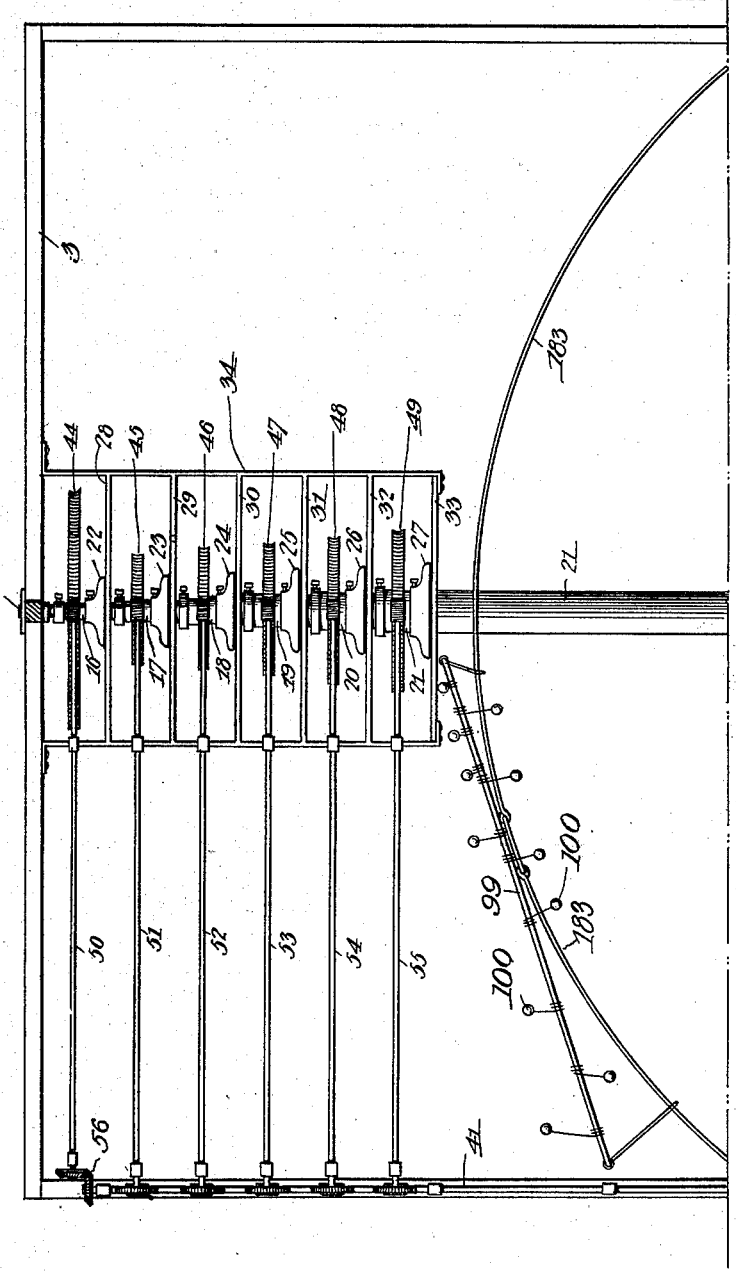

No. 749,508. PATENTED JAN. 12, 1904.
J. P. WESSON.
ORRERY.
APPLICATION FILED JULY 31, 1903.
NO MODEL. 8 SHEETS—SHEET 3.
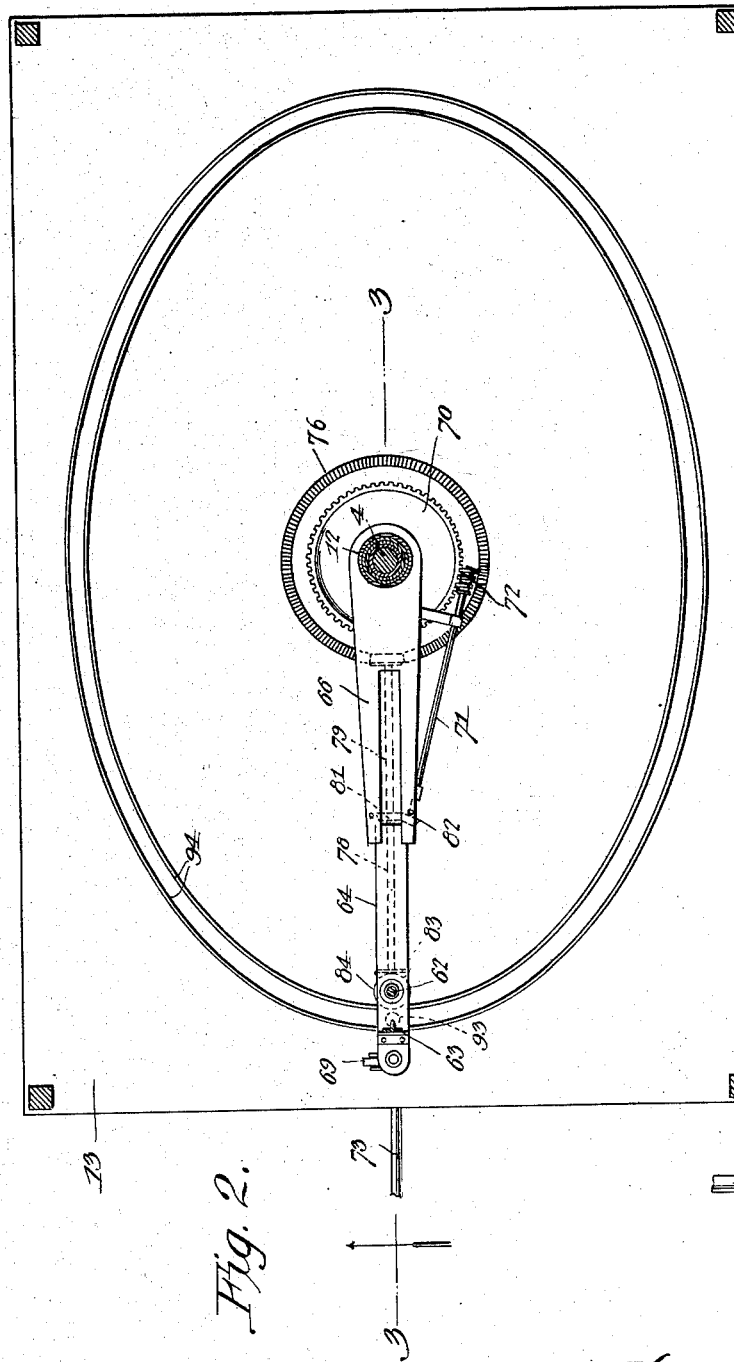
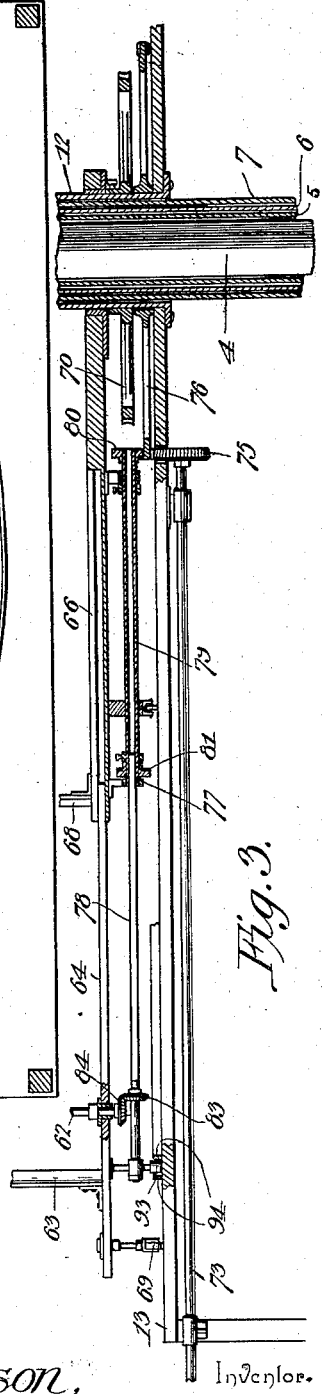

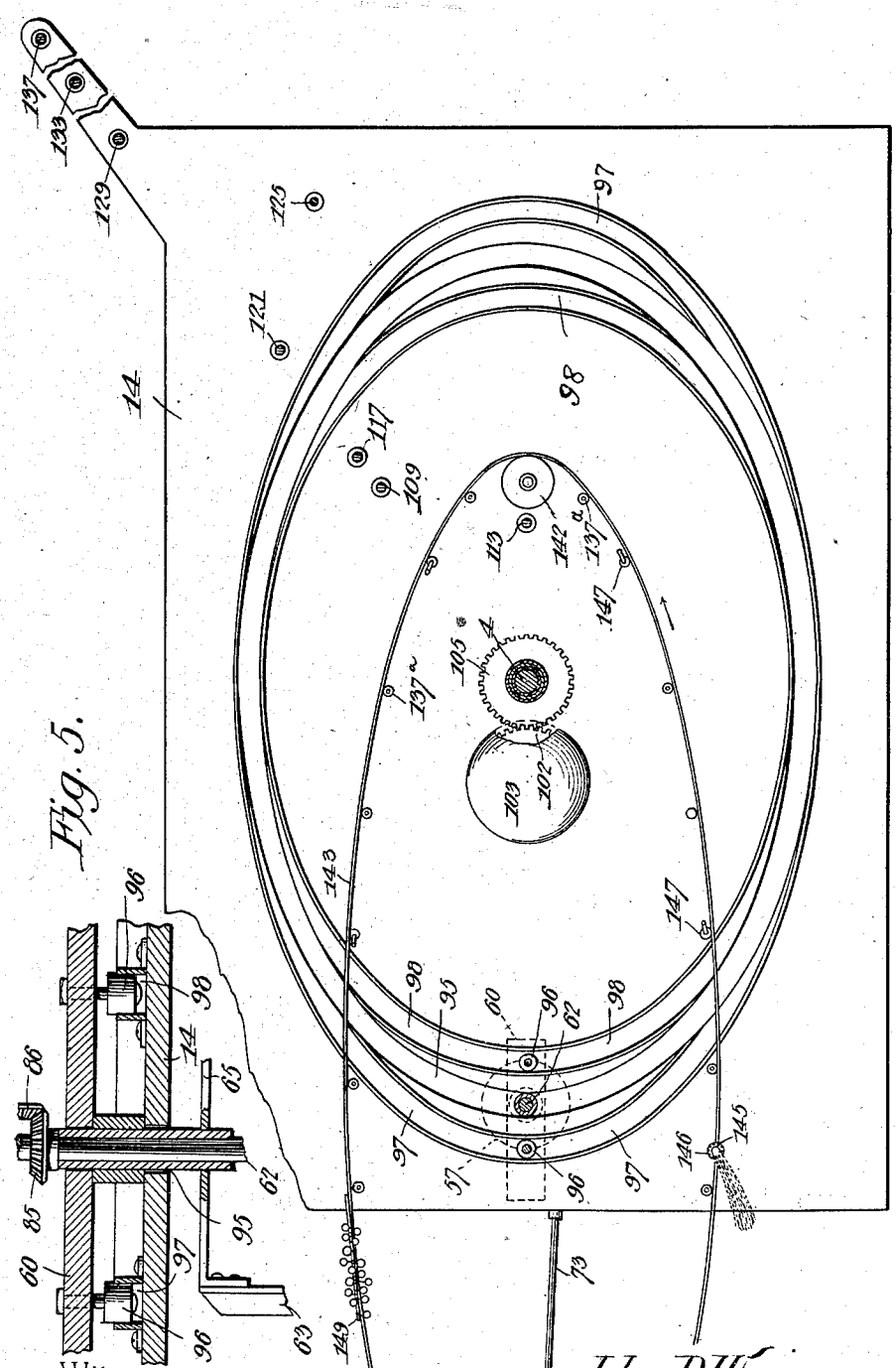

No. 749,508. PATENTED JAN. 12, 1904.
J. P. WESSON.
ORRERY.
APPLICATION FILED JULY 31, 1903.
NO MODEL. 8 SHEETS—SHEET 5.
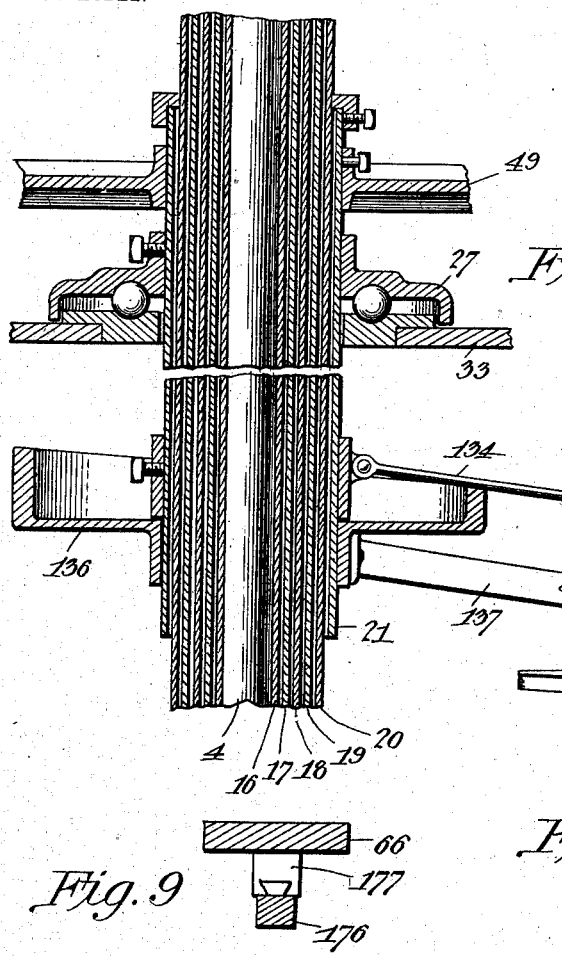
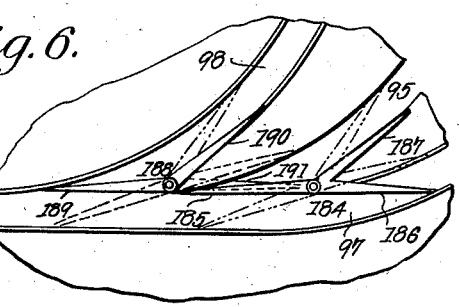
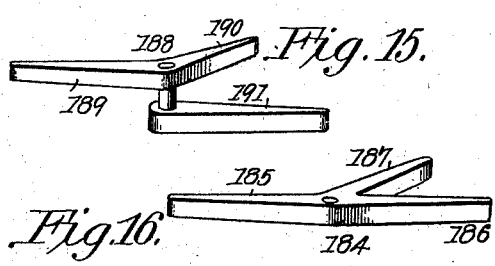
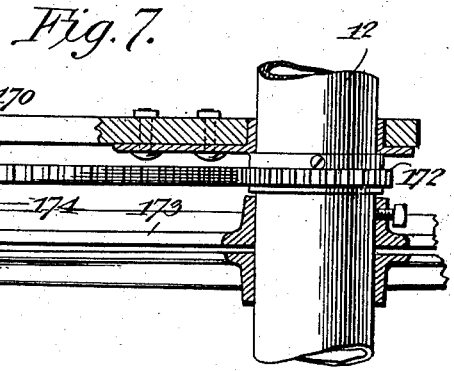
Witnesses
John P. Wesson, Inventor.
by C. A. Snow & Co.
Attorneys No. 749,508. PATENTED JAN. 12, 1904.
J. P. WESSON.
ORRERY.
APPLICATION FILED JULY 31, 1903.
NO MODEL. 8 SHEETS—SHEET 6.
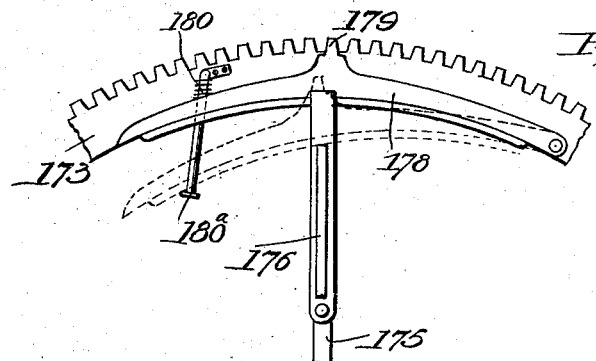
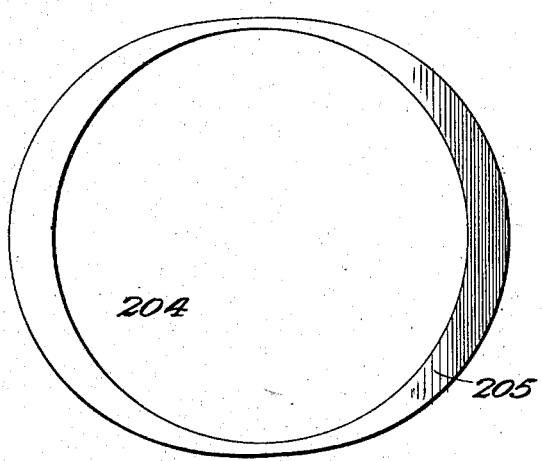
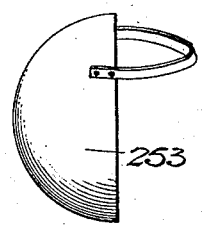
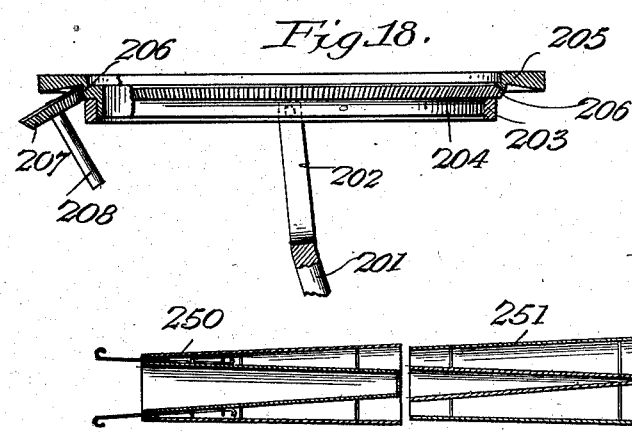
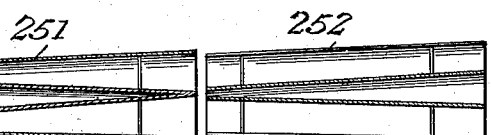
Witnesses
E. K. Stewart
J. W. Jochum, Jr.
John P. Wesson, Inventor.
by C. A. Snow & Co.
Attorneys No. 749,508. PATENTED JAN. 12, 1904.
J. P. WESSON.
ORRERY.
APPLICATION FILED JULY 31, 1903.
NO MODEL. 8 SHEETS—SHEET 7.
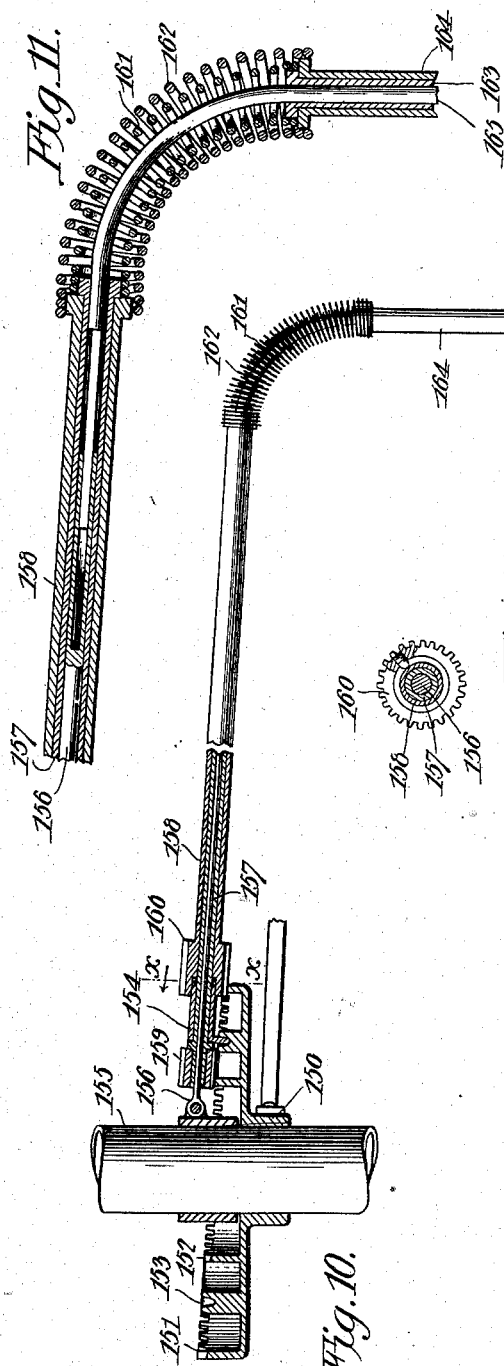
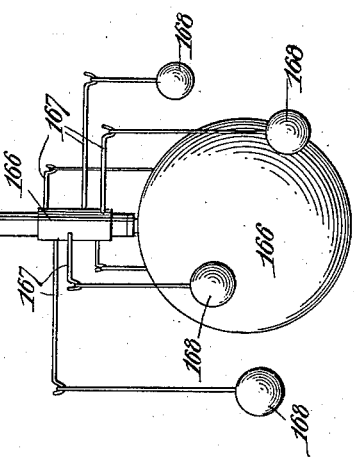
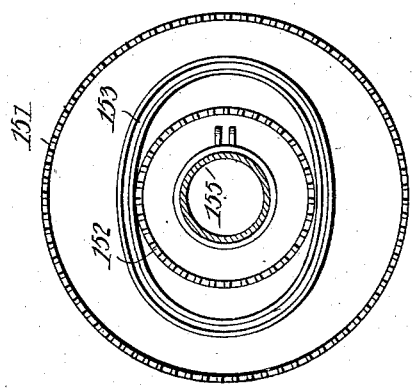
John P. Wesson, Inventor.
by C. A. Snow & Co.
Attorneys
Witnesses

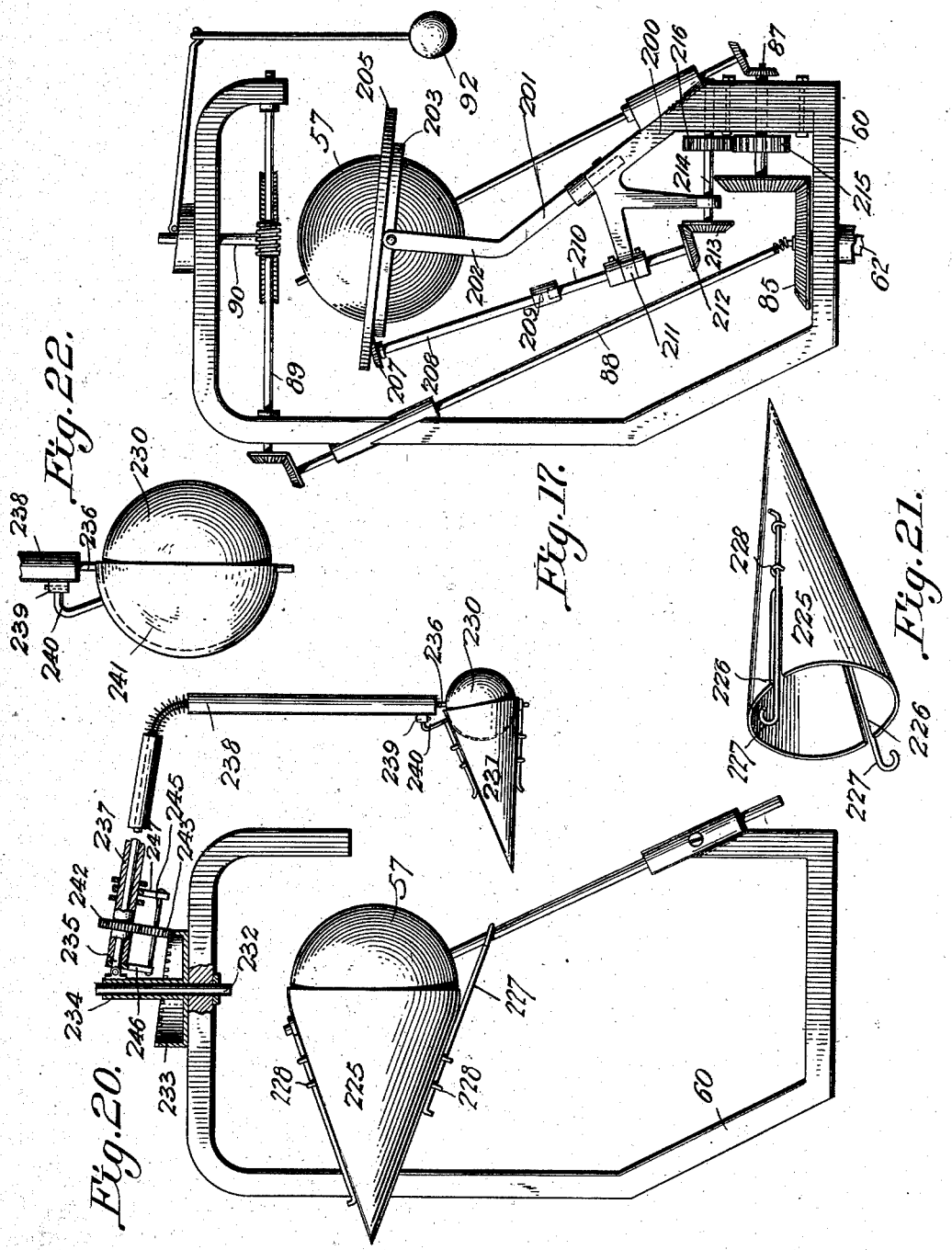

No. 749,508. Patented January 12, 1904.

UNITED STATES PATENT OFFICE.

JOHN PATTERSON WESSON, OF ATALLA, ALABAMA.

ORRERY.

SPECIFICATION forming part of Letters Patent No. 749,508, dated January 12, 1904.

Application filed July 31, 1903. Serial No. 167,784. (No model.)

*To all whom it may concern:*

Be it known that I, JOHN PATTERSON WESSON, a citizen of the United States, residing at Atalla, in the county of Etowah and State of Alabama, have invented a new and useful Orrery, of which the following is a specification.

This invention relates to orreries; and the object thereof is to provide in an orrery of comparatively simple construction and ease of operation means for illustrating accurately the orbital movement of the earth about the sun and means for illustrating with less degree of accuracy the movements of all of the planets of the solar system.

A further object of the invention is to provide in an orrery, in connection with the mechanism above mentioned, devices for showing in a general way the relative positions of the principal fixed stars and star groups, as well as means for illustrating the general characteristics of the movements of comets.

In the attainment of the objects above stated I make use of the construction and combination of parts of an orrery hereinafter fully described and claimed, and illustrated in the accompanying drawings, forming a part of this specification, in which corresponding parts are designated by the same characters of reference in the several views in which they appear, it being understood that various changes in the form, proportions, and exact details of the elements may be made without departing from the spirit of the invention or loss of its utility.

In the drawings, Figure 1 is a view in side elevation of the lower part of the orrery, showing the principal parts thereof. Fig. 1ª is a view in side elevation of the upper part of the orrery not shown in Fig. 1, both Fig. 1 and Fig. 1ª being taken from the same point of view. Fig. 2 is a view in plan of the lower supporting-plate, over which the earth-carrying arm travels, showing the track by means of which the earth-support is caused to travel in an elliptical path. Fig. 3 is a detail view in vertical section on the line 3 3 of Fig. 2. Fig. 4 is a plan view of the upper plate, over which the earth-carrying frame travels, showing the tracks whereby the direction of the earth's axis is kept constant and showing also the means for illustrating the movement of comets. Fig. 5 is a detail view in vertical section of a portion of the mechanism for keeping the direction of the earth's axis constant. Fig. 6 is a detail view in section through the central standard of the orrery and the concentric hollow shafts for independent rotation thereon, showing the form of the cam-plates by means of which the planes of the orbits of the planets are determined. Fig. 7 is a detail view, chiefly in side elevation, of the mechanism whereby the movement of the earth-globe is caused to deviate from the annual movement of the earth to conform to the conventions of the calendar. Fig. 8 is a detail plan view of a portion of the worm-wheel and the arm bearing an extra tooth, which are shown in Fig. 7. Fig. 9 is a detail view in cross-section of the means for supporting the tooth-carrying slide. Fig. 10 is a view, partly in elevation and partly in section, of a modified form of support for planets other than the earth. Fig. 11 is a detail view in section, on a larger scale, of the flexible portion of the supporting member shown in Fig. 10. Fig. 12 is a plan view of the cam-plate shown in Fig. 10. Fig. 13 is a cross-section on the line $x\ x$ of Fig. 10, the section being on larger scale. Fig. 14 is a plan view of a switch mechanism which may be employed in connection with the tracks shown in Fig. 4 to guide the rollers in proper relation to the tracks. Fig. 15 is a perspective view of one of the switches. Fig. 16 is a perspective view of the other form of switch. Fig. 17 is a view in side elevation of the earth-globe-carrying frame with the structures associated therewith and an attachment for illustrating the relation of the tides to the moon. Fig. 18 is a detail view, partly in section, of the tide-illustrating attachment shown in Fig. 17. Fig. 19 is a detail view in plan of the annular member representing the tides. Fig. 20 is a view in side elevation of the earth-globe-carrying frame with a modified form of moon-globe-supporting mechanism mounted thereon and attachments to the earth-globe and moon-globe to illustrate the formation of the shadows producing eclipses. Fig. 21 is a perspective view of the earth-shadow cone detached. Fig. 22 is a detail view of the moon-globe and the shield for illustrating the phases of the moon. Fig. 23 is a view in side elevation of the separated sections of a device for illustrating different kinds of solar eclipses. Fig. 24 is a view in side elevation of a shield to be applied to the sun-globe to show the effect of an eclipse in cutting off the solar light.

Referring to the drawings in detail, 1 designates the base of the apparatus, which may be a table or any other suitable surface, having rigidly mounted thereon at suitable points a plurality of vertical standards 2, upon the upper ends of which are supported cross-bars 3, which form the top of the apparatus. At the intersection of cross-bars 3 is rigidly secured the upper end of the standard 4, the lower end of which is rigidly fastened by any suitable means to the base 1. Surrounding the standard 4, near the upper and lower ends thereof, are two sets of concentric hollow shafts or tubes mounted for independent rotation upon the central standard. The lower set of hollow shafts comprises three, numbered from within outward 5, 6, and 7, respectively. The hollow shafts 5, 6, and 7 are supported at their lower ends in bearings provided on horizontal plates 8, 9, and 10, respectively, in a frame 11, suitably placed upon the base of the apparatus, and separate means for imparting rotation to each of the hollow shafts is provided, as will be explained in detail hereinafter. External to the hollow shaft 7 is a stationary sleeve 12, which is secured between two horizontal plates 13 and 14, both of which are supported upon suitable standards 15. The sleeve 12 is attached by means of screws or other suitable fastening devices passed through an outwardly-disposed flange, at the bottom thereof, to the lower plate 13. In the upper set of hollow shafts there are six, numbered from within outward 16, 17, 18, 19, 20, and 21, respectively. The hollow shafts 16, 17, 18, 19, 20, and 21 have attached thereto, by means of set-screws, the cup-shaped bearings 22, 23, 24, 25, 26, and 27, respectively, all of which are supported upon antifriction-balls, as shown in Fig. 6, the balls being carried in races supported upon the transverse plates 28, 29, 30, 31, 32, and 33 of the frame 34.

The means for imparting rotation to the hollow shafts in both of the sets above described is substantially the same, comprising a worm-wheel secured upon each of the hollow shafts adjacents to its point of support and a worm engaging the worm-wheel to impart movement thereto. Upon the shafts 5, 6, and 7 are provided worm-gears 35, 36, and 37, respectively, and meshing therewith are worms at the ends of shafts 38, 39, and 40, respectively, to all of which motion is imparted by bevel-gear connections from the shaft 41, supported in suitable bearings upon one of the standards 2 and driven by bevel-gear connections with the shaft 42, bearing a crank 43 to be turned by hand or otherwise. The hollow shafts 16, 17, 18, 19, 20, and 21 bear worm-wheels 44, 45, 46, 47, 48, and 49, respectively, to which motion is imparted from worms carried by shafts 50, 51, 52, 53, 54, and 55, respectively, all of which are driven from the shaft 41, above mentioned, with which shaft 50 is connected by means of bevel-gears 56, and shafts 51 to 55, inclusive, are connected by means of worm-gears, as shown in Fig. 1ª.

Considering now the earth-globe, the movements of which are made to correspond more closely to those of the planet represented thereby than the globes representing the other planets, it will be noted that the earth-globe 57 is supported upon an axis 58, which is rotatably mounted in an inclined sleeve 59 on one arm of a supporting-frame 60, the sleeve 59 being disposed at an angle of about twenty-three and one-half degrees to the vertical in order to preserve the relation of the earth's axis to the plane of the ecliptic or zodiac, which is in this apparatus represented by a horizontally-disposed ring 61, bearing, spaced at equidistant points, the "signs of the zodiac." The frame 60, carrying the earth-globe, is rotatably mounted on a vertical shaft 62, which is journaled in a frame 63, having arms 64 and 65, which are telescopically connected with arms 66 and 67, mounted for rotation upon the sleeve 12, which is rigidly attached to the plate 13, as already described. The arms 66 and 67 are spaced apart by a vertical brace 68, so that arms 64 and 65 will slide freely in the openings provided therefor, the outer ends of arm 66 and of the frame 63 being supported by casters 69, which travel over the plate 13.

In order to impart rotation to the arms 66 and 67 at a rate adapted to suitably represent the annual revolution of the earth in its orbit, a worm-wheel 70 is fixed upon the sleeve 12, and a short shaft 71, suitably supported in brackets projecting from the arm 66, is provided with a worm 72 to mesh with worm-wheel 70, and motion is imparted to shaft 71 as follows: A shaft 73 is connected by bevel-gearing 74 with driving-shaft 41 and provided at the inner end with a pinion 75, meshing with a double face-gear 76, loosely mounted on the sleeve 12 beneath the fixed worm-wheel 70, and a shaft consisting of squared telescopic sections 78 and 79 is journaled in brackets 77 on the under side of arms 64 and 66. At the inner end of section 79 is provided a pinion 80, which is in mesh with the upper cogs on the face-gear 76, and near the outer end of the section 79 is provided a bevel-gear 81, which meshes with a bevel-gear 82 on the shaft 71, which carries the worm 72. When motion is imparted to the shaft 73, the face-gear 76 is caused to rotate and motion is imparted therefrom to the pinion 80 and from the shaft-section 79 to the bevel-gears 81 and 82, so imparting motion to the shaft 71 and the worm 72. As the worm-wheel 70, with which the worm 72 is in mesh, is held stationary, the rotation of the worm-wheel 72 is accompanied by the travel of the worm around the periphery of the worm-wheel and a corresponding movement of the arm 66, by which the shaft carrying the worm is supported.

On the shaft-section 78, near the outer end, is fixed a bevel-gear 83, which meshes with the corresponding bevel-gear 84 at the bottom of shaft 62, and near the upper end of shaft 62 is provided a bevel-gear 85, which meshes with a bevel-gear 86 at the end of a short shaft 87, connected by bevel-gears with the axis 58 of the earth-globe 67. The gear connections just described form the means whereby the rotation is imparted to the earth-globe 57 to represent the diurnal rotation of the earth.

Rotatably mounted in a sleeve on the frame 60 is a shaft 88, flexibly connected with the upper end of shaft 62 and bearing at its free end a bevel-gear in mesh with a corresponding bevel-gear on a shaft 89, journaled in the upper portion of the frame 60, which carries a worm that meshes with the worm-wheel at the lower end of a short vertical shaft 90, journaled in the upper portion of the frame 60 and having connected with the upper end thereof for pivotal movement in a vertical plane an arm 91, from which is suspended a moon-globe 92. The arm 91 rests upon the inclined upper surface of an annular cam 92, suitably disposed to the plane of the ecliptic to properly represent the inclination of the moon's orbit thereto. By means of the connection between the shaft 62 and the moon-globe-carrying arm 91 movement will be imparted to the moon-globe 92 at a suitable rate to correspond to the movement of the earth-globe already mentioned.

In order to show the elliptical form of the earth's orbit, the arms 64 and 65 are telescopically connected with arms 66 and 67, as explained in a preceding paragraph, and a roller 93 at the lower end of a pendent bracket on the under surface of arm 64 is disposed between curved guide-walls 94, which are fixed on the plate 13 and spaced apart to form an elliptical track for guiding the roller 93. In plate 14 there is provided an elliptical slot 95, suitably proportioned in relation to the walls 94 to permit the passage of the upper end of shaft 62, on which is rotatably mounted the frame 60, in which is rotatably carried earth-globe 57. As the arms 66 and 67 are drawn around the sleeve 12 by the worm 72 and worm-wheel 70 the engagement of roller 93 with the walls 94 causes the arms 64 and 65 to slide slightly in and out along the ways provided for them in the arms 66 and 67, thus clearly illustrating the elliptical nature of the earth's orbit.

In order that the axis 58 of the earth-globe 57 may be inclined constantly in one direction, there are provided beneath the base of the frame 60 a pair of rolls 96, and on the upper surface of the plate 14 are formed two elliptical tracks 97 and 98, having equal minor axes, but different major axes, as shown. The elliptical tracks 97 and 98 coincide at their sides with the slot 95, but at the ends are disposed on opposite sides of the slot 95, as seen in Fig. 4, so that the rolls 96, which are at a fixed distance apart, may always be so held that the line connecting them will remain parallel to itself. With the tracks 97 and 98 disposed in the manner described and shown the rolls 96 are caused to travel around said tracks in such manner that each of the rolls 96 will during half a complete orbital movement travel along track 97 and during the other half of the orbital movement will travel along track 98. As the tracks 97 and 98 keep the line connecting the two rolls 96 always parallel to itself, the base of the frame 60 will always be disposed in the same direction and the sleeve in which is journaled the axis 58 will also be kept constantly disposed in one direction.

As the axis of the earth points almost directly toward the pole-star, I have provided on the upper portion of my orrery a ring 99, which is inclined to the plane of the ecliptic at the same angle that the equator of the earth-globe is, and on the ring 99 I have fixed, by means of wire supports, a plurality of small globes 100 to represent the pole-star and the stars lying in proximity thereto.

In order to illustrate the phenomena of aphelion and perihelion, I have provided on the plate 14, near the central standard 4, a lamp 101, having a rotatable globe 103, which represents the sun and is supported on a gear 102. The gear 102 is supported on the reservoir 104 and is in mesh with the gear 105 on the hollow shaft 7, the gear connections between the shaft 7 and driving-shaft 41 being properly proportioned to cause the sun-globe to rotate at a rate proportionate to the rate of rotation imparted to the earth-globe 57. The axis of the sun-globe is shown as vertical; but it is obvious that, if desired, the axis may be inclined and beveled gears substituted in lieu of the horizontally-arranged gears 102 and 105.

The hollow shafts 5 and 6 of the lower set and all of the hollow shafts of the upper set have arms projecting therefrom for supporting planets. The shaft 5 carries an arm 106, from which is suspended a globe 107, representing Venus, the arm 106 being pivoted for movement in a vertical plane and being caused to revolve in a plane inclined to the plane of the ecliptic by means of a cam-plate 108, provided with an upwardly-disposed flange the margin of which lies in an inclined plane, as shown. The cam-plate 108 is supported by a bracket 109, which extends upward from the plate 14, as best seen in Fig.

4. Hollow shaft 6 carries a pivoted arm 110, supporting a globe 111, representing the planet Mercury, the plane of the orbit of which is determined by cam-plate 112, carried by bracket 113. Hollow shaft 16 carries an arm 114, from which is suspended a globe 115, representing the planet Mars and accompanied by two small globes representing the moons of Mars, which are supported by wire hangers projecting from the hanger by which the globe 115 is carried. The plane of the orbit of globe 116 is determined by the cam-plate 116 on bracket 117. The hollow shaft 17 is provided with a plurality of arms 118, supporting a ring 119, to which are attached by wire hangers about thirty small globes representing a swarm of minor planets whose orbits lie between those of Mars and Jupiter. As the orbits of the minor planets of different sizes and eccentricity have different degrees of inclination to the plane of the ecliptic, it is impossible by the means above mentioned to illustrate accurately the relations of the orbits of the minor planets to the plane of the ecliptic, and no attempt has been made to do so, the object being merely to show the general position of the minor planets with reference to Mars and Jupiter and to show that they have orbits lying in planes inclined to the plane of the ecliptic. The plane of orbital movement of ring 119 is determined by a cam-plate 120 on bracket 121.

From the arm 122, carried by the hollow shaft 18, is suspended a globe 123, representing the planet Jupiter, having several small globes suspended on wire hangers from the main hanger, carrying the globe 123, to represent the various moons of Jupiter. The plane of the orbit of the planet Jupiter is represented by means of the cam-plate 124 on bracket 125. Saturn, the next planet in order proceeding outward toward the limits of the solar system, is represented by a globe 127, provided with an equatorial ring, the globe 127 being suspended from an arm 126, pivotally carried by the hollow shaft 19 and revolving in an orbit whose plane is determined by cam-plate 128, carried by bracket 129. The moons of Saturn are represented by small globes suspended from the main hanger, which carries the globe 127.

Pivotally supported on the hollow shaft 20 is the arm 130, from which is suspended globe 131, representing the planet of Uranus and provided with small globes representing the moons of the planet. The plane of the orbit is determined by cam-plate 132, carried by bracket 133.

The outermost planet, Neptune, is represented by a globe 135, suspended from an arm 134, pivotally carried by the hollow shaft 21, and the plane of its orbital movement is determined by cam-plate 136, carried by bracket 137.

It will have been observed from the foregoing description of the apparatus for representing the movements of the sun and planets and of the mode of associating the moons with the planets that the movements of the earth are most faithfully portrayed by the apparatus and that the movements of the other planets are indicated only approximately. It is obvious that by means of mechanism similar to that used to illustrate the movements of the earth the movements of the other planetary bodies might be illustrated with a corresponding degree of accuracy; but for the purposes of instruction, for which this apparatus is designed, such accurate representation of the movements of the other planets is unnecessary, and an apparatus constructed to show accurately the movements of all the planets of the solar system would be too extensive for use in institutions for which this apparatus is primarily designed. It is more important that the general relations only of the other planets to the sun and the plane of the ecliptic be illustrated and that the earth, as the planet in which human beings are most keenly interested, be shown in all of its relations to the sun.

In order to show in a general way the relations of comets and the swarms of meteors to the sun, a plurality of rollers $137^a$ are mounted on studs fixed upon a plate 14 and so arranged as to present an approximately parabolic path, and at one side of the apparatus is provided a support 138 for a driving-shaft 139, gearing 140, and a pulley 141, operated thereby. A pulley 142 is provided on the upper surface of plate 14 at the point of maximum convexity of the parabolic path determined by rollers $137^a$, and a belt 143, formed, preferably, of thin steel tape, is supported by the rollers $137^a$ and pulleys 141 and 142. The belt 143 is driven from the shaft 139, operating driving-pulley 141, and is provided with a standard 144, at the top of which is rotatably mounted a cap 145, bearing a small globe, from which projects a light plume of fluffy material to represent a comet. At the bottom of the cap 145 a small gear 146 is provided, and at intervals along the parabolic path determined by the rollers $137^a$ are provided standards 147, having projecting arms adapted to engage the gear 146 as it passes and produce a partial rotation thereof at each engagement of the gear with one of the arms on the standard 147. By means of the gear and the standards 147, with the arms carried thereby, cap 145 is so turned that the plume representing the tail of the comet will be at all times disposed approximately away from the globe representing the sun.

The belt 143 carries in addition to the standard 144 a standard 148, provided at the top with the transverse bar 149, on which are supported in irregular order a plurality of small bodies, representing meteors which travel through the solar system along parabolic paths.

If it is desired to illustrate the orbital movements of the planets other than the earth with greater accuracy than can be accomplished by means of the mechanism hereinbefore described, recourse may be had to the form of support for each planet. (Illustrated in Figs. 10 to 13, inclusive.) In the form of support referred to there will be provided for each planet a cam-plate similar to cam-plate 150 (shown in Fig. 10) and presenting a plurality of upwardly-disposed flanges 151 and 152, the margins of which are inclined, as shown, and which are provided with teeth to form stationary gears. Between the gears 151 and 152 will be provided a flange 153, which is also upwardly disposed and which is grooved on the upper face thereof, as shown in Fig. 12, to form a guide-track for a projection formed on a sleeve 154 and arranged on the lower side thereof, as shown in Fig. 10. The track formed by the flange 153 will be of generally elliptical contour to correspond in each case to the ellipticity of the orbit of the planet represented thereby, and the sleeve 154 will be caused to slide toward and away from the shaft 155, on which is mounted the planet-carrying arm 156. The arm 156 will, if the planet be provided with moons, have mounted thereon for independent rotation two concentric hollow shafts 157 and 158, of which the former is provided with a gear 159 to mesh with stationary gear 152 and the latter carries a gear 160 to mesh with stationary gear 151. To the outer ends of the two hollow shafts 157 and 158 are attached concentric spiral springs 161 and 162, respectively, forming flexible connections with concentric sleeves 163 and 164, respectively, in the former of which is secured the stem 165, at the lower end of which is secured a globe 166, representing the planet. The outer sleeve 164 has fixed thereon a collar 166, from which project a plurality of arms 167, from which are suspended globes 168, representing the moons of the planet. The gears 159 and 160 will be so proportioned with respect to the stationary gears 151 and 152 that the rates of rotation imparted to planet-globe 166 and to the arms carrying the moon-globes 168 will correspond as nearly as possible to the proportionate rates of rotation of the planets and moons represented thereby. It is of course to be understood that in case the rates of rotation of the several moons of a planet are radically different the number of hollow shafts comprised in the supporting-arm may be increased and gears provided to bring about the independent rotation of the moons at suitable rates of speed.

In order to illustrate the way in which the calendar is arranged to compensate for the want of correspondence the diurnal rotation of the earth with its annular revolution by the inclusion of an extra day in every fourth year to form the "leap" year, I provide the mechanism illustrated in Figs. 7, 8, and 9, by which the movement of the earth-globe will be caused to deviate somewhat from the actual movement of the earth to correspond to the assumed movement of the calendar. Under the arm 66 I provide a stud 170, on which is rotatably mounted a gear 171, which is in mesh with a fixed gear 172 on the sleeve 12 above the worm-wheel, which will in this instance be of a special form and which is designated as 173. The gear 171 is four times the diameter of the gear 172, and consequently one rotation of the gear 171 occurs in four revolutions of the arm 66 about the sleeve 12. On the under surface of gear 171 is a stud 174, bearing a pitman 175, the outer end of which is pivotally connected with the slide 176, having on the upper side thereof a dovetailed rib which reciprocates in a guide-block 177. At the outer end of the slide 176 is provided a hook for engagement with a flange formed on an arm 178, pivoted on the inside of the periphery of worm-wheel 173. Arm 178 is located adjacent to a V-shaped opening through the periphery of the wheel and has a tooth 179 of the same size as those of the worm-wheel. The stud 174 is placed at such a distance from the center of rotation of the gear 171 that at each rotation of the gear 171 the slide 176 will be forced outward just far enough to bring the tooth 179, carried by the arm 178, into position between the teeth on the periphery of the worm-wheel upon opposite sides of the opening therein, so that the tooth 179 will be added to the teeth upon the periphery of the worm-wheel 173 and the total number of teeth thereon increased by one. As the number of teeth on the periphery of the worm-wheel 173 is normally three hundred and sixty-five, the insertion of the tooth 178 upon every fourth revolution of the arm 66 causes every such revolution of the arm 66 to require a period longer than that of the other revolutions by the addition of one three-hundred-and-sixty-fifth. After the hook on the end of slide 176 passes off the flange on arm 178 the arm will be returned to inoperative position by means of the spring 180 on the short rod 180$^a$, carried by the worm 173. It is of course to be understood that the worm-wheel 173 is made of sufficient resiliency to permit the ready insertion and removal of the tooth 179 in the opening in its periphery without permanently expanding the periphery of the wheel, and it is also to be understood that at the time of insertion of the slide 176 into the opening in the periphery of the worm-wheel the worm 72, which coöperates therewith, must be in engagement with the portion of the periphery of the worm-wheel into which slide 176 is inserted.

In order to show on the orrery the position of the equatorial belt of stars, a ring 181 is supported upon the standards 2 2 in the position shown in Fig. 1, and there are attached to the ring at irregular intervals throughout its entire circumference a plurality of small globes representing the stars forming the equatorial belt, these smaller globular bodies being supported by means of wire hangers of any preferred form the lengths of which and the points of attachment of which to the ring 181 will be determined to correspond to the relative positions of the stars to be represented. In order to show the relative positions of other fixed stars, nebulæ, and constellations distributed over the northern half of the celestial sphere, arms 182, extending from the ring 61, representing the plane of the ecliptic, are provided, and curved supporting members 183, corresponding to the meridians of celestial longitude, are mounted upon the arms 182, forming a framework upon which bodies representing any of the fixed stars whose positions are to be indicated may be carried.

In order to prevent absolutely any possibility of the movement of the rollers 96 in tracks 97 and 98 being disturbed, I may employ switches illustrated in Figs. 14, 15, and 16, which are arranged, as shown, at the points where the tracks 97 and 98 diverge from the slot 95. The switch controlling the entry of a roller into the track 97 is designated generally as 184 and comprises three arms 185, 186, and 187, all of which lie above the plate 14. The switch controlling the entry of the roller into track 98 is designated generally as 188 and comprises arms 189 and 190 above the plate 14 and arm 191 below the plate 14. The arm 191 of switch 188 is so disposed with reference to the arms 189 and 190 that when the switch is in the position shown in solid lines in Fig. 14 and the shaft 62, supporting the arm on which are carried rolls 96, approaches the switch the sleeve encircling the upper portion of shaft 62 will engage with the arm 191, which then projects across the slot 95, and will swing the switch 188, so that the arm 189 will be thrown across the path of the roll which is to enter the track 98 and direct it into that track, the latter position of the switch being indicated in dotted lines. As the roll passes along the track 98 it will engage the arm 190 to return the switch to solid-line position. The arms 185, 186, and 187 of switch 184 are so arranged that as the shaft 62 approaches the switch the forward roll 96, carried by the frame on the upper end of shaft 62, will engage the arm 186 and throw it into dotted-line position to permit the passage of the shaft 62 along the slot 95 to cause the turning of switch 188 to dotted-line position, and after the forward roll 96 has passed the switch 184 the shaft 62 will engage with arm 187 to return the switch 184 to solid-line position. Hence it will be seen that after the shaft 62, carrying the frame 60, has passed the switches they will be left in solid-line position, but prior to the entrance of the rear roll 96 into the track 98 the switches will be thrown into dotted-line position. It will also be noted that with the switches in solid-line position it is impossible for the forward roll 96 to pass into track 98 or to be thrown into registration with the slot 95.

It will have been observed from the foregoing description that motion is imparted to the sun-globe and to the planet-globes by turning the crank 43 on shaft 42, and it is to be understood that the various power-transmitting members are so proportioned that the rates of movement imparted to the bodies representing the various members of the planetary system will be so proportioned as to correspond to the movements of the bodies represented. The movement of the belt 143, carrying the standards 144 and 148, upon which are supported the bodies representing the comet and a swarm of meteors, is separately brought about by the rotation of the shaft 139, and it is to be understood that when the movements of the planetary bodies are to be illustrated the belt 143 must be dispensed with, else the standards carried thereby will interfere with the movement of the planet-globes. On the other hand, when the belt 143 is set in motion to illustrate the movements of the comet and the swarm of meteors the planetary globes must remain stationary.

In Figs. 17, 18, and 19 there is illustrated an attachment for showing the relation of the tides to the movement of the moon. The attachment comprises a bracket 200, shown as riveted to the frame 60, in which the earth-globe and mechanism for rotating it are mounted. The bracket 200 has removably attached to the upper end thereof a bracket 201, having arms 202 extending on either side of the earth-globe and having removably secured to the upper ends thereof a ring 203, within which there is supported an annulus 204, having a flange 205 of the form shown in Fig. 19. The flange 205 at diametrically opposite points has a much greater width than at points midway between, and the broadened parts are intended to represent the spring tides. The annulus is to be supported approximately in the plane of the moon's orbit—that is to say, at an inclination of a little more than five degrees to the plane of the ecliptic—and in order to impart movement to the annulus, so that its broadened portions corresponding to the spring tides may lie on the side of the earth-globe nearest the moon-globe and upon the opposite side, there is provided beneath the flange 205 a series of beveled gear-teeth 206, which mesh with a beveled pinion 207 on a shaft 208, preferably connected by means of a thimble 209 with a second shaft 210, which is journaled in a tubular bearing 211, supported in an arm of the bracket 200. At the lower end of the shaft 210 is provided a beveled gear 212, which meshes with a similar beveled gear 213 on a shaft 214, supported by the bracket 200 and driven by means of a gear 215 on the shaft 87, which meshes with a gear 216 on the shaft 214. The gears are all so proportioned that the annulus 204 is caused to revolve around the earth-globe at the same rate of speed that the moon-globe does, so that the portions of the flange 205 representing the spring tides may keep up with the moon-globe in its travel about the earth-globe. As it is not always desirable to have the parts representing the tides and their movements in position, the bracket 201 is detachable from bracket 200 and the shaft 208 is detachable from shaft 210, thus permitting the removal of the parts from the position shown in Fig. 17.

In Figs. 20 to 24, inclusive, are shown a number of attachments for use with the apparatus to illustrate the phenomena of eclipses and the moon's phases.

In Fig. 20 there is shown attached to the earth-globe a hollow conical shell 225, representing the earth's shadow. The shell is slotted at 226 to receive the end of the standard representing the earth's axis and provided with hooks 227, slidably mounted in guide-loops 228, by which the hooks are frictionally held to permit the adjustment of the conical shell to the position shown. The hooks 227 engage with the standard representing the earth's axis and hold the shell at such a position relative to the earth-globe 57 that the apex of the shell is directed away from the sun-globe 103. In Fig. 20 there is also shown a device for supporting a moon-globe 230 and a shadow-cone 231, so that they may be independently movable. The supporting device comprises a rotatable standard 232, supported in the upper portion of frame 60, a cam 233, having the upper surface thereof formed into gear-teeth, as shown, a sleeve 234, mounted on the standard 232 and having pivotally attached thereto an arm 235, flexibly connected at its end with a pendent rod 236, on which the moon-globe 230 is carried. Surrounding the arm 235 is sleeve 237, having flexibly connected therewith at the outer end a sleeve 238, on the lower end of which is provided a socket 239, from which is suspended, by means of a stem 240, a hemispherical shield 241, upon which the shadow-cone 231 is secured by means of fastening devices similar to those described on the shadow-cone 225. In order to impart movement to the sleeve 237, I provide thereon a gear 242, which meshes with a similar gear 243, mounted on a shaft 245, supported in brackets 246 and 247, depending from the arm 235 and the sleeve 237. The gear 243 meshes with the gear-teeth formed on the cam 233, so that when rotary movement is imparted to the shaft 232 to cause the travel of the moon-globe in its orbit the sleeve 237 will be rotated in the opposite direction at a speed such that the shadow-cone 231 will always be disposed opposite to the sun-globe.

It is of course to be understood that the shadow-cones shown in the figures above mentioned are much shorter in proportion to their width than the actual shadows cast by the earth and moon; but they conform to the proportions of the parts of the apparatus and illustrate very well the general character of the shadows cast by the earth and moon.

By attaching the shadow-cone 231 and leaving in position the hemispherical shield 241 I am enabled to illustrate very conveniently the phases of the moon.

In Fig. 23 is illustrated a telescopic device made in three sections to illustrate the character of the shadows when total, partial, and annular eclipses of the sun are produced. To illustrate a total eclipse of the sun, the section of the device marked 250 will be mounted upon the moon-globe, which must of course be at such relative position to the earth-globe and sun-globe that the end of the part of the section representing the umbra may be disposed toward and adjacent to the earth-globe. In order to illustrate an annular eclipse of the sun, all three sections of the device (designated, respectively, 250, 251, and 252) must be mounted on the moon-globe.

The hood or shield 253 (shown in Fig. 24 and provided with a loop to fit around the upper portion of the sun-globe) is designed to cover the sun-surface to show the way in which the sun is hidden in a total eclipse and, if desired, a fringe of light fluffy material—such, for example, as ostrich-feathers or a fringe of carded wool—may be arranged at the margin of the shield to illustrate in a general way the nature of the corona which accompanies the total eclipse of the sun.

Having thus described the construction and operation of my invention, what I claim is new, and desire to secure by Letters Patent, is—

1. In an apparatus of the class described, the combination of a plurality of planet-globe-carrying arms mounted for independent rotation on a common axis, means for imparting movement to all of said arms and means for guiding said arms so that they will move in planes disposed at angles to each other.

2. In an apparatus of the class described, the combination of a central stationary standard, a plurality of concentric hollow shafts mounted for independent rotation on said standard, a plurality of planet-globe-carrying arms pivoted one to each of said hollow shafts, means for imparting rotative movement to all of said hollow shafts, and means for guiding the movement of said pivotal arms in non-parallel planes.

3. In an apparatus of the class described, the combination of a stationary central standard, a plurality of concentric hollow shafts mounted thereon for independent rotation, a planet-globe-carrying arm pivoted to each of said shafts, and means for determining the movement of each planet-globe-carrying arm in a plane inclined to the plane of movement of the other arms, said determining means comprising a fixed cam associated with each of said arms.

4. In an apparatus of the class described, the combination of a central standard, a plurality of concentric hollow shafts mounted thereon for independent rotation, a planet-globe-carrying arm pivotally mounted on each of said shafts for pivotal movement in a vertical plane, means for guiding all of said pivoted arms in non-parallel planes, said means comprising a plurality of cam-plates supported by brackets mounted at successively-increasing distances from the central standard, a cam-plate being associated with each of said arms, and means for imparting rotative movement to said concentric shafts.

5. In an apparatus of the class described, the combination of a central standard, a plurality of concentric hollow shafts mounted for independent rotation thereon, means for imparting independent rotative movement to said shafts at different speeds, a plurality of planet-globe-carrying arms pivotally mounted one on each of said concentric shafts, and means for guiding said arms so that they will travel in planes corresponding in inclination to the inclinations of the planes of the orbits of the planets represented by the globes carried by said arm.

6. In an apparatus of the class described the combination of a rotary shaft, a planet-globe-carrying arm mounted thereon for movement in a vertical plane, a stationary cam-plate over which said arm travels, a sleeve on said arm from which the planet-globe is suspended, and means for reciprocating said sleeve on said arm.

7. In an apparatus of the class described the combination of a rotary shaft, a planet-globe-carrying arm pivotally mounted on said shaft, a cam-plate over which said arm travels, a sleeve slidably mounted on said arm, an elliptical track formed on said cam-plate and a projection on said sleeve adapted to engage and be guided by the track on said cam-plate.

8. In an apparatus of the class described the combination of a rotary shaft, a planet-globe-carrying arm pivotally mounted on said shaft for movement in a vertical plane, a stationary cam over which said arm travels, a sleeve rotatably mounted on said arm, a planet-globe suspended from said sleeve, connections between said planet-globe and said sleeve whereby rotary movement is imparted to said globe, a stationary gear on said cam, and a pinion on said sleeve in mesh with said stationary gear.

9. In an apparatus of the class described the combination of a rotary shaft, a planet-globe-carrying arm pivotally mounted on said shaft for movement in a vertical plane, a stationary cam-plate over which said arm travels, a sleeve rotatably mounted on said arm, a stationary gear on said cam-plate and a pinion on said sleeve in mesh with said stationary gear, a planet-globe and a flexible tubular connection between said sleeve and said globe.

10. In an apparatus of the class described the combination of a rotary shaft, a planet-globe-carrying arm pivotally mounted on said shaft for movement in a vertical plane, a cam-plate over which said arm travels, a sleeve slidably and rotatably mounted on said arm, a planet-globe, a flexible tubular connection between said planet-globe and said sleeve, a track of elliptical form on said cam-plate, a stationary gear also on said cam-plate, a collar provided with a projection mounted on said sleeve and having the projection in engagement with said track, and a pinion rigidly attached to said sleeve and in mesh with said stationary gear.

11. In an apparatus of the class described the combination of a rotary shaft, a planet-globe-carrying arm pivotally mounted thereon for movement in a vertical plane, a stationary cam over which said arm travels, a plurality of concentric sleeves carried by said arm and adapted for independent rotation thereon and for sliding movement together, a planet-globe, a flexible tubular connection between said globe and the innermost concentric sleeve, a moon-globe hanger, a flexible tubular connection between said moon-globe hanger and the outermost concentric sleeve, an elliptical track on said cam-plate, a plurality of stationary gears on said cam-plate, a collar mounted on one of said sleeves and having a projection engaging said track and a pinion upon each of said sleeves in mesh with one of said stationary gears.

12. In an apparatus of the class described, an elliptical track, a frame supported for orbital movement in said track, an inclined shaft forming the axis of an earth-globe supported in said frame, means for imparting rotatable movement to said shaft and means for preventing rotation of said frame to keep the direction of said earth-globe axis constant.

13. In an apparatus of the class described the combination of an elliptical track, a standard supported for orbital movement in said track, a frame rotatably mounted on said standard, an earth-globe supported in said frame, two elliptical tracks having their minor axes equal to the minor axis of the first-named elliptical track and having their major axes of different lengths from that of the first-mentioned track arranged with reference to the first-named track so that at the extremities of their minor axes, the three tracks coincide and at the extremities of their major axes, the first-named track lies between the last-named tracks and fixed projections on said frame engaging the last-named tracks.

14. In an apparatus of the class described the combination with a table or plate having an elliptical slot formed therein, of a shaft extending through said slot and supported for orbital movement therein, an earth-globe-supporting frame rotatably mounted on said shaft, a pair of elliptical tracks arranged to coincide with said slot at the extremities of its minor axis and to lie equidistant and on opposite sides of said slot at the extremities of its major axis, and projections on said frame engaging said tracks.

15. In an apparatus of the class described the combination of a table or plate having an elliptical slot, a shaft extending through said slot and supported for orbital movement therein, an earth-globe-carrying frame rotatably mounted on said shaft, a pair of elliptical tracks arranged to coincide with said slot at the extremities of its minor axis and to lie equidistant from and on opposite sides of said slot at the extremities of its major axis, projections on said frame engaging said tracks and automatic switches arranged at the points of divergence of said tracks from said slot to cause such engagement of said projections with said tracks as will prevent the rotation of said frame.

16. In an apparatus of the class described the combination of a table, guide members arranged thereon in a suitable path, a sun-globe suitably positioned in relation to said guide members, a belt supported on said guide members and a body representing a comet carried by said belt.

17. In an apparatus of the class described the combination of a table or plate, a plurality of rolls supported on said plate in a parabolic path, a belt supported on said rolls, a sun-globe suitably supported in relation to said rolls and a member representing a comet carried by said belt.

18. In an apparatus of the class described the combination of a table or plate, guide members arranged thereon in a suitable path, a sun-globe suitably positioned in relation to said guide members, a belt mounted on said guide members, a standard carried by said belt, a body representing a comet rotatably mounted on said standard and means provided at intervals along the path formed by said guide members, for imparting partial rotation to said body representing a comet.

19. In an apparatus of the class described the combination of a table or plate, a plurality of guide members arranged upon said plate in a suitable path, a sun-globe suitably positioned in relation to said guide members, a belt mounted for travel on said guide members, a standard carried by said belt, a body having a plume attached thereto rotatably mounted on said standard to represent a comet, a pinion rigidly associated with said body, standards arranged at intervals along the path defined by said guide members, and arms carried by said standards and adapted to engage the pinion to impart partial rotation thereto.

20. In an apparatus of the class described the combination of a plate, a plurality of guide members positioned thereon in a suitable path, a sun-globe suitably supported in relation to said guide members, a belt mounted for travel on said guide members, a standard carried by said belt and a plurality of small globes representing meteors carried by said standard.

21. In an apparatus of the class described, a rotary shaft, a plurality of arms mounted thereon for pivotal movement in vertical plane, a stationary cam-plate over which said arms travel, a ring attached to said arms at their outer ends, and a plurality of small globes representing the minor planets, suitably supported on said ring.

22. In an apparatus of the class described, the combination of a stationary worm-wheel, an arm supporting an earth-globe mounted for orbital movement adjacent to said worm-wheel, a shaft rotatably supported in brackets on said arm, a worm on said shaft in mesh with said worm-wheel and means for imparting rotation to said shaft.

23. In an apparatus of the class described, the combination of a stationary worm-wheel, an earth-globe-supporting arm mounted for orbital movement adjacent to said worm-wheel, a shaft journaled in brackets on said arm, a worm on said shaft engaging said worm-wheel, a pinion on said shaft, a double-face gear rotatably mounted adjacent to said worm-wheel, driving connections between said double-face gear and said pinion, a driving-pinion in mesh with said double-face gear, and means for imparting movement to said driving-pinion.

24. In an apparatus of the class described the combination of a stationary worm-wheel having three hundred and sixty-five teeth and having an opening through its periphery which is normally closed by the elasticity of the material of which the worm-wheel is made, an earth-globe-carrying arm mounted for orbital movement above said worm-wheel, a worm carried by said arm in mesh with said wheel, means for imparting movement to said worm, a tooth movably supported within said wheel, and means operative upon every fourth orbital movement of said arm to insert said tooth into the opening in the periphery of said worm-wheel.

25. In an apparatus of the class described, the combination of a stationary worm-wheel having three hundred and sixty-five teeth and having an opening through its periphery which is normally closed by the elasticity of the material of which the wheel is made, an earth-globe-carrying arm mounted for orbital movement above said worm-wheel, a worm carried by said arm in mesh with said wheel, means for imparting movement to said worm, an arm pivoted to the worm-wheel adjacent to the opening in the periphery thereof, a tooth provided on said arm, and means operative upon every fourth orbital movement of the earth-globe-carrying arm to engage the arm of the worm-wheel and force the tool carried thereby through the opening in the periphery of the worm-wheel.

26. In an apparatus of the class described, the combination of a sun-globe, a moon-globe, an earth-globe, means for imparting orbital movement to said earth-globe and moon-globe, and means provided on said moon-globe for illustrating the formation of the umbra and penumbra causing eclipses.

27. In an apparatus of the class described, the combination of a sun-globe, a moon-globe, an earth-globe, means for imparting movement to said earth-globe and moon-globe in their orbits, and a shadow-illustrating attachment for said moon-globe comprising a plurality of separable sections.

28. In an apparatus of the class described, the combination of a sun-globe, a moon-globe, an earth-globe, means for imparting movement to said moon-globe and earth-globe in their orbits, and a shadow-illustrating attachment for said moon-globe consisting of a plurality of telescopically-connected sections.

29. In an apparatus of the class described, the combination of a sun-globe, a moon-globe, an earth-globe, means for supporting all of said globes, means for imparting movement to said earth-globe and moon-globe in their orbits, and a shadow-illustrating attachment comprising a conical shell and hooks slidably mounted thereon for engagement with the means for supporting one of said globes.

30. The combination in an apparatus of the class described, of an earth-globe, a moon-globe revoluble about the earth-globe, and an annular member having a flange broadened at diametrically opposite points to represent the tides, and means for causing revolution of said annular member about the earth-globe at the same rate of revolution as that of the moon-globe.

In testimony that I claim the foregoing as my own I have hereto affixed my signature in the presence of two witnesses.

JOHN PATTERSON WESSON.

Witnesses:
FITZHUGH GERARD LEE,
JAMES HENRY WESSON.